(12) United States Patent
Cheng et al.

(10) Patent No.: US 9,426,403 B2
(45) Date of Patent: Aug. 23, 2016

(54) VIDEO PLAYBACK SYSTEM AND METHOD

(71) Applicant: ZTE CORPORATION, Shenzhen, Guangdong Province (CN)

(72) Inventors: Wei Cheng, Shenzhen (CN); Wei Zhang, Shenzhen (CN); Jie Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/425,672

(22) PCT Filed: Aug. 9, 2013

(86) PCT No.: PCT/CN2013/081190
§ 371 (c)(1),
(2) Date: Mar. 4, 2015

(87) PCT Pub. No.: WO2014/036877
PCT Pub. Date: Mar. 13, 2014

(65) Prior Publication Data
US 2015/0229868 A1  Aug. 13, 2015

(30) Foreign Application Priority Data
Sep. 5, 2012 (CN) .......................... 2012 1 0324651

(51) Int. Cl.
*H04N 7/18* (2006.01)
*G08B 13/196* (2006.01)
*H04N 5/265* (2006.01)
*H04N 5/445* (2011.01)

(52) U.S. Cl.
CPC .... *H04N 5/44504* (2013.01); *G08B 13/19682* (2013.01); *H04N 5/265* (2013.01); *H04N 7/18* (2013.01)

(58) Field of Classification Search
CPC .... H04N 7/18; H04N 5/44504; H04N 5/265; G08B 13/19682
See application file for complete search history.

(56) References Cited

U.S. PATENT DOCUMENTS

| 2006/0085534 A1* | 4/2006 | Ralston | H03M 7/40 709/223 |
| 2007/0005804 A1* | 1/2007 | Rideout | H04L 12/1822 709/246 |
| 2009/0244285 A1* | 10/2009 | Chathukutty | H04N 7/183 348/150 |

FOREIGN PATENT DOCUMENTS

| CN | 1761319A A | 4/2006 |
| CN | 101043507 A | 9/2007 |
| CN | 102510478 A | 6/2012 |
| WO | WO2006074328 A2 | 7/2006 |
| WO | 2011127859 A2 | 10/2011 |

* cited by examiner

*Primary Examiner* — Brian Yenke
*Assistant Examiner* — Sean Haiem
(74) *Attorney, Agent, or Firm* — Ling Wu; Stephen Yang; Ling and Yang Intellectual Property

(57) ABSTRACT

The embodiments of the present document disclose a system and method for playing videos, and the system includes: a streaming media server, configured to send a video stream to a real-time video intelligent analysis system and video surveillance center, and receive and buffer a text stream corresponding to the video stream from the real-time video intelligent analysis system, and send the text stream to the video surveillance center; the real-time video intelligent analysis system, configured to perform real-time analysis on the video stream and output the text stream corresponding to the video stream to the streaming media server; the video surveillance center, configured to request for and receive the video stream and the text stream from the streaming media server, compensate for a lost text frame in the text stream according to the video stream, and output mixed videos of overlay video stream and text stream.

7 Claims, 4 Drawing Sheets

VIDEO PLAYBACK SYSTEM AND METHOD

TECHNICAL FIELD

The present document relates to video playback field, and particularly, to a system and method for playing videos.

BACKGROUND

In the video surveillance system, basic functions such as real-time video browsing and real-time video recording and so on can be provided. However, if it is required to implement labeling and corresponding alarm for a target video, it is required to perform real-time analysis on the video.

Moreover, in some specific application scenarios, it requires pretty high accuracy and stability in video tracking, such as in human face tracking and recognition. Where, the accuracy refers to that the labeling location in video tracking is accurate, while the stability refers to that the labeling information is consecutive in video image displaying.

In the related art, there is no solution on how to analyze, track and label a specific video accurately.

SUMMARY

The embodiments of the present document provide a system and a method for playing videos, which at least solves the problem that the object being tracked cannot be labeled accurately and stably after the video surveillance system analyzes the real-time videos.

The embodiments of present document provide a system for playing videos, comprising:

a streaming media server, configured to buffer and send a video stream to a real-time video intelligent analysis system and a video surveillance center, and receive and buffer a text stream corresponding to the video stream sent by the real-time video intelligent analysis system, and send the text stream to the video surveillance center;

the real-time video intelligent analysis system, configured to perform real-time analysis on the video stream output by the streaming media server, and output the text stream corresponding to the video stream to the streaming media server;

the video surveillance center, configured to request for and receive the video stream and the text stream output by the streaming media server, compensate for a lost text frame in the text stream according to the video stream, and output mixed videos after overlaying the video stream and the text stream after compensation.

Preferably, the video surveillance center comprises:

a matching unit, configured to match the video stream received from the streaming media server with the text stream corresponding to the video stream;

a video frame overlaying format determination unit, configured to determine a video frame overlaying format of the video frame according to a matched result of the matching unit; and a text frame compensation unit, configured to compensate for the lost text frame according to a result of determining the overlaying format.

Preferably, the matching unit is further configured to, when a quantity of the buffered video frames received by the video surveillance center reaches a preset threshold, match the video frame in the video stream with the text frame having a timestamp equal to the timestamp of the video frame in the text stream; wherein, if there are corresponding text frames matching with all of three consecutive video frames, the matching is successful, otherwise, the matching is failed.

Preferably, the video frame overlaying format determination unit is further configured to, when the video frame in the video stream fails to match with the text frame having equal timestamp to that of the video frame in the text stream, determine that the video frame overlaying format is a non-text overlaying format or a motion compensation format according to a corresponding relationship between the video frame and the text frame; wherein, if none of the three consecutive video frames have corresponding text frames, the video frame overlaying format is the non-text overlaying format, otherwise, the video frame overlaying format is the motion compensation format.

Preferably, when the video frame overlaying format is the motion compensation format, the text frame compensation unit is further configured to, when a first two frames in the three consecutive video frames have corresponding text frames, compensate for the text frame corresponding to the third video frame; when the first frame and the third frame in the three consecutive video frames exist, compensate for the text frame corresponding to the second video frame in the middle.

Preferably, the system comprises a plurality of video surveillance centers.

The embodiments of the present document provide a method for playing videos, comprising:

a streaming media server sending an original video stream to a real-time video intelligent analysis system;

the real-time video intelligent analysis system performing real-time analysis on the video stream output by the streaming media server, and outputting a text stream corresponding to the video stream to the streaming media server;

the streaming media server storing the original video stream and the text stream respectively, and when receiving a request for mixing videos sent by a video surveillance center, the streaming media server sending the video stream and the text stream respectively to the video surveillance center;

the video surveillance center receiving the video stream and the text stream output by the streaming media server, compensating for a lost text frame in the text stream according to the video stream, and outputting a mixed video after overlaying the video stream and the text stream after compensation.

Preferably, the step of the video surveillance center compensating for a lost text frame in the text stream according to the video stream comprises:

matching the video stream received from the streaming media server with the text stream corresponding to the video stream;

determining a video frame overlaying format according to a matched result; and compensate for the lost text frame according to a result of determining the overlaying format.

Preferably, the step of matching the video stream received from the streaming media server with the text stream corresponding to the video stream comprises:

when a quantity of the video frames received by the video surveillance center reaches a preset threshold, matching the video frame in the video stream with the text frame in the text stream having equal timestamp to that of the video frame; wherein, if all of three consecutive video frames match successfully with the text frames, the matching is successful, otherwise, the matching is failed.

Preferably, the step of determining a video frame overlaying format according to a matched result comprises:

when the video frame in the video stream matches successfully with the text frame in the text stream having equal timestamp to that of the video frame, directly overlaying videos and output mixed videos;

when the video frame in the video stream fails to match with the text frame in the text stream having equal timestamp to that of the video frame, determining that the video frame overlaying format is a non-text overlaying format or a motion compensation format according to a corresponding relationship between the video frame and the text frame; wherein, if none of the three consecutive video frames have corresponding text frames, the video frame overlaying format is the non-text overlaying format, otherwise, the video frame overlaying format is the motion compensation format.

Preferably, when the video frame overlaying format is the non-text overlaying format, determining that there is no lost text frame;

when the video frame overlaying format is the motion compensation format, the step of compensating for a lost text frame according to a result of determining the overlaying format comprises: when a first two frames in the three consecutive video frames have corresponding text frames, compensating for the text frame corresponding to the third video frame; when the first frame and the third frame in the three consecutive video frames have corresponding text frames, compensating for the text frame corresponding to the second video frame in the middle.

According to the system for playing videos provided by the embodiments of the present document, the text stream labeling the video stream is acquired by analyzing the video stream in real time, the complete text stream is acquired by compensating for the lost text frame in the text stream, and the video stream and the text stream are overlaid and the mixed video is output at last, thereby the problem that the object being tracked cannot be labeled accurately and stably after the real-time video is analyzed in the video surveillance system in related art is solved.

PREFERRED EMBODIMENTS OF THE PRESENT DOCUMENT

The embodiments of the present document provide a system and a method for playing videos, which can analyze videos in the video surveillance system accurately in real time and label the object being tracked accurately and stably.

The method and the system for playing videos provided by the embodiments of the present document are described in the following in combination with the accompanying drawings.

Figure 1:
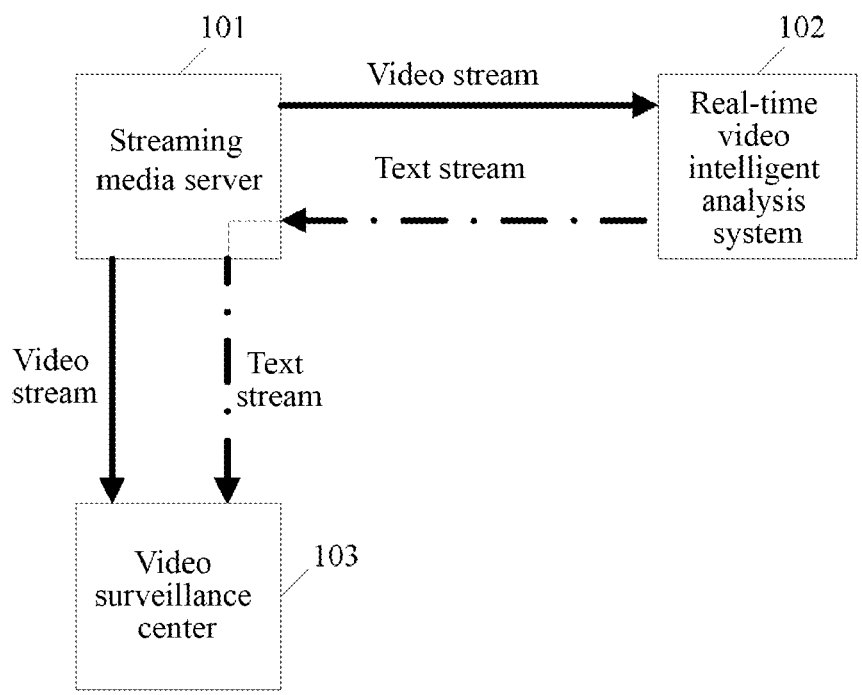
FIG. 1 is a structural diagram of a system for playing videos provided by an embodiment of the present document.

Refer to FIG. 1, the system for playing videos provided by the embodiment of the present document mainly comprises:

a streaming media server 101, configured to send a video stream to a real-time video intelligent analysis system and a video surveillance center; and receive and buffer a text stream corresponding to the video stream sent by the real-time video intelligent analysis system, and send the text stream to the video surveillance center;

the real-time video intelligent analysis system 102, configured to perform real-time analysis on the video stream output by the streaming media server, and output the text stream corresponding to the video stream to the streaming media server; wherein, the text stream includes location information of the label in the video stream;

the video surveillance center 103, configured to receive the video stream and the text stream output by the streaming media server, compensate for a lost text frame in the text stream according to the video stream, and output mixed videos after overlaying the video stream and the text stream after the compensation.

Figure 2:
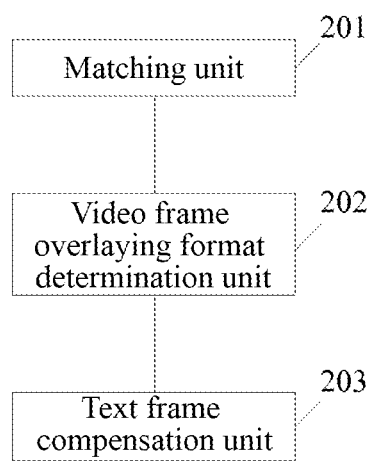
FIG. 2 is a structural diagram of a video surveillance center in the system for playing videos provided by an embodiment of the present document.

Preferably, refer to FIG. 2, the video surveillance center 103 comprises:

a matching unit 201, configured to match the video stream received from the streaming media server with the text stream corresponding to the video stream;

a video frame overlaying format determination unit 202, configured to determine a video frame overlaying format according to the matching result;

a text frame compensation unit 203, configured to compensate for a lost text frame according to the determination result of the overlaying format.

Preferably, the matching unit 201 is configured to, when the quantity of the buffered video frames received by the video surveillance center 103 reaches a preset threshold, match the video frame in the video stream with the text frame in the text stream having equal timestamp to that of the video frame; wherein, if three consecutive video frames $f_{n-1}$, $f_n$, and $f_{n+1}$ all match successfully with the corresponding text frames $I_{n-1}$, $I_n$ and $I_{n+1}$, the matching is successful, otherwise, the matching is failed.

Wherein, f represents video frame, and I represents text frame.

Figure 3:
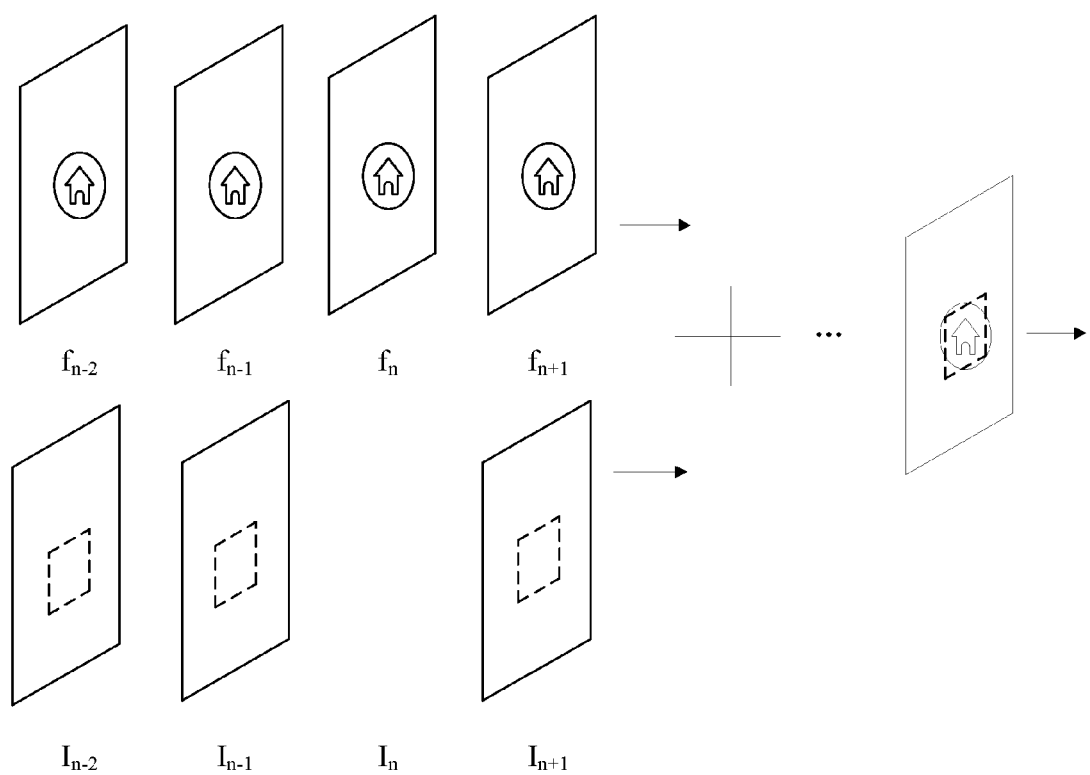
FIG. 3 is a schematic diagram of a motion compensation mode provided by an embodiment of the present document.

Preferably, the video frame overlaying format determination unit 202 is configured to, when the video frame in the video stream fails to match with the text frame in the text stream having equal timestamp to that of the video frame, determine that the video frame overlaying format is a non-text overlaying format or a motion compensation format according to a corresponding relationship between the video frame and the text frame; wherein, if none of three consecutive video frames $f_{n-1}$, $f_n$ and $f_{n+1}$ have corresponding text frames $I_{n-1}$, $I_n$ and $I_{n+1}$, the video frame overlaying format is the non-text overlaying format, otherwise, refer to FIG. 3, the video frame overlaying format is the motion compensation format.

Preferably, when the video overlaying format is motion compensation format, the text frame compensation unit 203 is also configured to: when the first two frames in the three consecutive video frames have corresponding text frames, perform external expansion compensation on the text frame corresponding to the third video frame, and acquire a compensated text frame.

Wherein, the external expansion compensation is:

$I_{n-2}$, $I_{n-1}$ exist, while $I_{n+1}$ does not exist, then external expansion compensation is performed on $I_n$, and the compensation information $S_d$ is:

$$S_d = S_{I_{n-1}} - S_{I_{n-2}},$$

and then the compensation text frame is: $S_{I_n} = S_{I_{n-1}} + S_d$;

wherein, S represents the location where the text frame I is to be labeled in the video frame f, including the location information of a plurality of points required to determine the location where the text frame is labeled.

When the first frame and the third frame in the three consecutive video frames exist, perform interpolation compensation on the text frame corresponding to the second video frame in the middle, and acquire the compensated text frame;

the interpolation compensation is:

$I_{n-1}$, $I_{n+1}$ exist, interpolation compensation is performed on $I_n$, and the compensation information $S_d$ is:

$$S_d = (S_{I_{n+1}} - S_{I_{n-1}})/2,$$

and then the compensation text frame is: $S_{I_n} = S_{I_{n-1}} + S_d$.

Preferably, the video surveillance center may simultaneously process a plurality of pairs of different video streams and text streams, for instance, the video surveillance center may simultaneously process 16 pairs of different video streams and corresponding text streams, and perform compensation and output respectively at the same time.

Preferably, the quantity of the video surveillance center may be multiple according to the demand of the user, so as to be convenient for the subscribers to process a great deal of videos.

The method for playing videos provided by an embodiment of the present document mainly comprises the following steps of:

a streaming media server sending an original video stream to a real-time video intelligent analysis system;

the real-time video intelligent analysis system performing real-time analysis on the video stream output by the streaming media server, and outputting a text stream corresponding to the video stream to the streaming media server;

the streaming media server storing the original video stream and the text stream respectively, and the streaming media server sending the video stream and the text stream respectively to some video surveillance center when receiving a request for mixing videos sent by the video surveillance center;

the video surveillance center receiving the video stream and the text stream output by the streaming media server, compensating for lost text frames in the text stream according to the video stream, and outputting the mixed videos after overlaying the video stream and the text stream after the compensation.

In practical applications, the matching unit 201 may be actualized by the Central Processing Unit (CPU), the Digital Signal Processor (DSP) or the Field-Programmable Gate Array (FPGA) in the video surveillance center 103;

the video frame overlaying format determination unit 202 may be actualized by the CUP, the DSP or the FPGA in the video surveillance center 103;

the text frame compensation unit 203 may be actualized by the CUP, the DSP or the FPGA in the video surveillance center 103.

Figure 4:
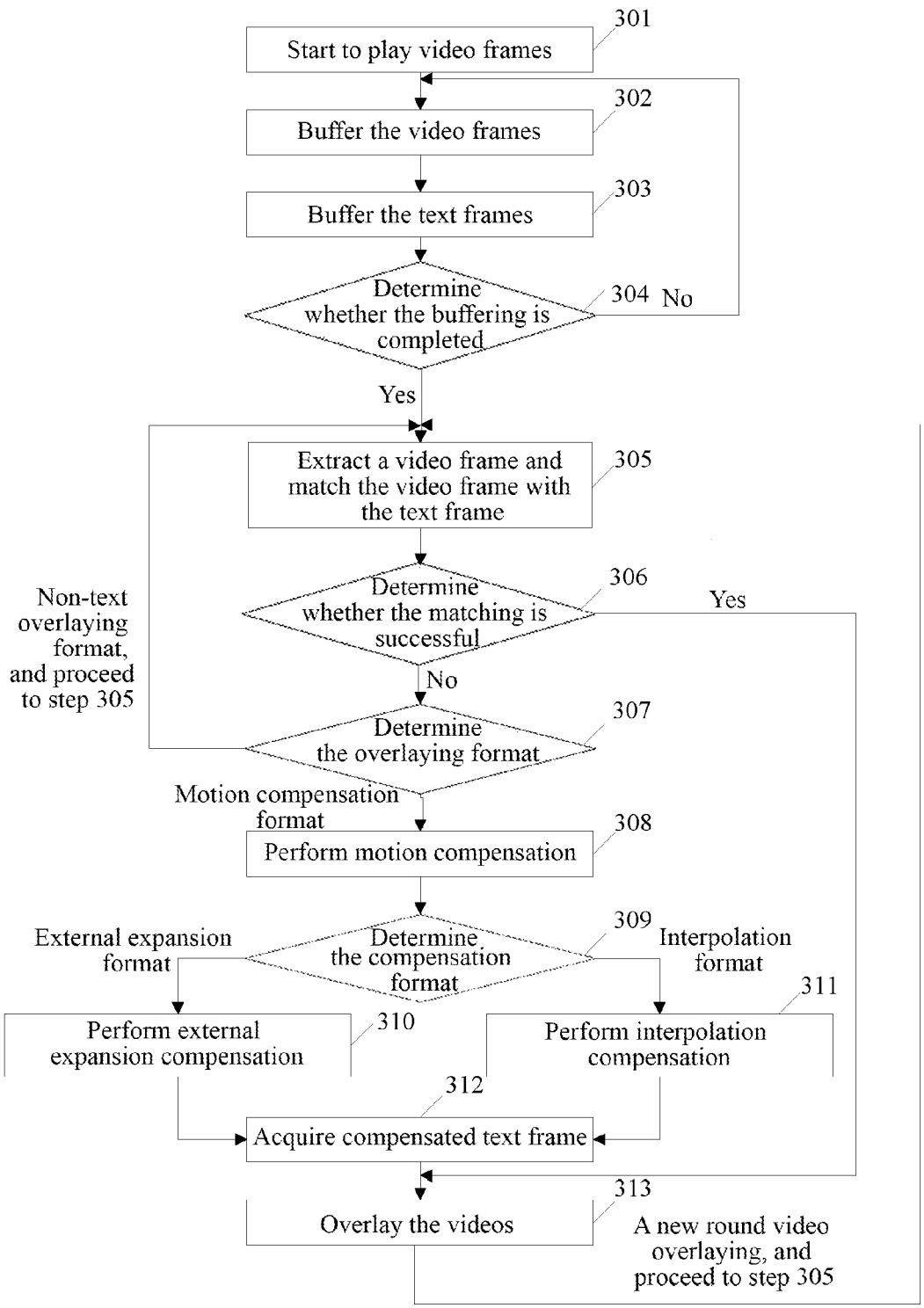
FIG. 4 is a flowchart diagram of a method for playing videos provided by an embodiment of the present document.

See FIG. 4, the detailed flowchart of the method for playing videos provided by an embodiment of the present document comprises the following steps.

In step 301, start to play videos, and the video surveillance center receives a video stream and a text stream requested from the streaming media server.

In step 302, buffer the video stream. As it always takes time to analyze the videos in practical systems, in general, the text stream got by the video surveillance center always lags behind the video stream, therefore it needs to buffer the video stream.

In step 303, buffer the text stream. Whenever the video frame arrives, it is required to match a text frame having a timestamp equal to that of the arrived video frame from the text stream queue], therefore, it also needs to buffer the text stream.

In step 304, determine whether the buffering is completed. The determination is made based on whether the number of the buffered video frames is larger than n, where n is required to be adjusted according to parameters of an intelligent analysis system in the system.

If the number of the buffered video frames is larger than n, the buffering is completed and it proceeds to step 305.

If the number of the buffered video frames is not larger than n, the buffering is not completed and it proceeds to step 302.

In step 305, extract the video frame, and match the video frame with the text frame.

In step 306, determine whether the matching is successful, if yes, proceed to step 313, otherwise, proceed to step 307.

In step 307, determine the overlaying format of the unmatched video frames.

If all of the video frames $f_{n-1}$, $f_n$ and $f_{+1}$ have no corresponding text frames $I_{n-1}$, $I_n$, $I_{n+1}$, it indicates that it is non-text frame format now, the overlaying operation is not performed and return to step 305.

Otherwise, proceed to step 308.

In step 308, enter into motion compensation format.

In step 309, determine the motion compensation format.

If $I_{n-2}$ and $I_{n-1}$ exist, while $I_{n+1}$ does not exist, then it is external expansion compensation format, and proceed to step 310; if both $I_{n-1}$ and $I_{n+1}$ exist, it is interpolation format, and proceed to step 311.

In step 310, perform external expansion compensation, and calculate compensation information $S_d$: $S_d = S_{I_{n-1}} - S_{I_{n-2}}$.

Where S represents the location where the text frame I is to be labeled in the video frame f, including location information of a plurality of points required to determine the location for labeling the text frame I.

In step 311, perform interpolation compensation, and calculate the compensation information $S_d$: $S_d = (S_{I_{n+1}} - S_{I_{n-1}})/2$.

In step 312, acquire compensated text frame $S_{I_n}$, which is: $S_{I_n} = S_{I_{n-1}} + S_d$.

In step 313, perform video overlaying processing, label the information of the text frame into the corresponding video frame, and play the video.

After step 313 is completed, return back to step 305 and start a new round of video overlaying.

In summary, according to the system for playing videos provided by the embodiments of the present document, the text stream labeling the video stream is acquired by analyzing the video stream in real time, the complete text stream is acquired by compensating the lost text frame, and the video stream and the text stream are overlaid and the mixed video is output at last; after the video surveillance system analyzes the real-time video, it can label the object being tracked accurately and stably.

Those skilled in the art should understand that the embodiments of the present document may be provided by a method, a system, or a computer program product. Therefore, the present document may adopt the form of complete hardware embodiments, complete software embodiments, or the embodiments combining software with hardware. Moreover, the present document may adopt the form of computer program product which includes computer available program codes and is carried out on one or more computer available storage media (including but not limited to magnetic disk storage and optical storage and so on).

The present document is described by referring to the flowcharts and/or block diagrams of the method, the device (system) and the computer program product according to the embodiments of the present document. It should be understood that the computer program instructions may be used to implement each flow and/or block of the flowcharts and/or block diagrams, and the combination of the flow and/or block of the flowcharts and/or block diagrams. These computer program instructions may be provided to a general-purpose computer, a dedicated computer, an embedded processor or the processor of other programmable data processing device to generate a machine, so that the instructions carried out by a computer or the processor of other programmable data processing device generate an equipment with a function specified by one or more flows of the flowchart and/or one or more blocks of the block diagram.

These computer program instructions may also be stored in a computer readable memory which can guide a computer or other programmable data processing device to work in a certain way, so that the instructions stored in the computer readable memory generate manufactured products including instruction equipment, and the instruction equipment implements a function specified by one or more flows in the flowchart and/or one or more blocks in the block diagram.

These computer program instructions may also be loaded on a computer or other programmable data processing device, so that a series of operation steps may be carried out on the computer or other programmable device to generate processing implemented by computers, thereby, the instructions carried out on a computer or other programmable device provide steps for implement a function specified by one or more flow of the flowchart and/or one or more block of the block diagram.

Obviously, those skilled in the art may make various changes and transformations on the present document without departing from the spirit and scope of the present document. As thus, if these modifications and transformations of the present document belong to the scope of the claims of the present document and equivalent technologies thereof, the present document also intends to comprise these changes and transformations.

INDUSTRIAL APPLICABILITY

According to the system for playing videos provided by the embodiments of the present document, the text stream labeling the video stream is acquired by analyzing the video stream in real time, the complete text stream is acquired by compensating the lost text frame in the text stream, and the video stream and the text stream are overlaid and the mixed video is output at last, thereby the problem that the object being tracked cannot be labeled accurately and stably after the real-time video is analyzed in the video surveillance system in related art is solved.

What we claim is:

1. A system for playing videos, comprising:
    a streaming media server, configured to buffer and send a video stream to a real-time video intelligent analysis system and a video surveillance center, and receive and buffer a text stream corresponding to the video stream sent by the real-time video intelligent analysis system, and send the text stream to the video surveillance center;
    the real-time video intelligent analysis system, configured to perform real-time analysis on the video stream output by the streaming media server, and output the text stream corresponding to the video stream to the streaming media server;
    the video surveillance center, configured to request for and receive the video stream and the text stream output by the streaming media server, compensate for a lost text frame in the text stream according to the video stream, and output mixed videos after overlaying the video stream and the text stream after compensation; wherein the video surveillance center comprises:
    a matching unit, configured to match the video stream received from the streaming media server with the text stream corresponding to the video stream;
    a video frame overlaying format determination unit, configured to determine a video frame overlaying format of the video frame according to a matched result of the matching unit; and
    a text frame compensation unit, configured to compensate for the lost text frame according to a result of determining the overlaying format;
    wherein the matching unit is further configured to, when a quantity of the buffered video frames received by the video surveillance center reaches a preset threshold, match the video frame in the video stream with the text frame having a timestamp equal to the timestamp of the video frame in the text stream; wherein,
    if there are corresponding text frames matching with all of three consecutive video frames, the matching is successful, otherwise, the matching is failed.

2. The system for playing videos according to claim 1, wherein,
    the video frame overlaying format determination unit is further configured to, when the video frame in the video stream fails to match with the text frame having equal timestamp to that of the video frame in the text stream, determine that the video frame overlaying format is a non-text overlaying format or a motion compensation format according to a corresponding relationship between the video frame and the text frame; wherein,
    if none of the three consecutive video frames have corresponding text frames, the video frame overlaying format is the non-text overlaying format, otherwise, the video frame overlaying format is the motion compensation format.

3. The system for playing videos according to claim 2, wherein,
    when the video frame overlaying format is the motion compensation format, the text frame compensation unit is further configured to, when a first two frames in the three consecutive video frames have corresponding text frames, compensate for the text frame corresponding to the third video frame; when the first frame and the third frame in the three consecutive video frames exist, compensate for the text frame corresponding to the second video frame in the middle.

4. The system for playing videos according to claim 1, wherein, the system comprises a plurality of video surveillance centers.

5. A method for playing videos, comprising:

a streaming media server sending an original video stream to a real-time video intelligent analysis system;

the real-time video intelligent analysis system performing real-time analysis on the video stream output by the streaming media server, and outputting a text stream corresponding to the video stream to the streaming media server;

the streaming media server storing the original video stream and the text stream respectively, and when receiving a request for mixing videos sent by a video surveillance center, the streaming media server sending the video stream and the text stream respectively to the video surveillance center;

the video surveillance center receiving the video stream and the text stream output by the streaming media server, compensating for a lost text frame in the text stream according to the video stream, and outputting a mixed video after overlaying the video stream and the text stream after compensation; wherein the step of the video surveillance center compensating for a lost text frame in the text stream according to the video stream comprises:

matching the video stream received from the streaming media server with the text stream corresponding to the video stream;

determining a video frame overlaying format according to a matched result; and compensate for the lost text frame according to a result of determining the overlaying format;

wherein, the step of matching the video stream received from the streaming media server with the text stream corresponding to the video stream comprises:

when a quantity of the video frames received by the video surveillance center reaches a preset threshold, matching the video frame in the video stream with the text frame in the text stream having equal timestamp to that of the video frame; wherein, if all of three consecutive video frames match successfully with the text frames, the matching is successful, otherwise, the matching is failed.

6. The method according to claim 5, wherein, the step of determining a video frame overlaying format according to a matched result comprises:

when the video frame in the video stream matches successfully with the text frame in the text stream having equal timestamp to that of the video frame, directly overlaying videos and output mixed videos;

when the video frame in the video stream fails to match with the text frame in the text stream having equal timestamp to that of the video frame, determining that the video frame overlaying format is a non-text overlaying format or a motion compensation format according to a corresponding relationship between the video frame and the text frame; wherein, if none of the three consecutive video frames have corresponding text frames, the video frame overlaying format is the non-text overlaying format, otherwise, the video frame overlaying format is the motion compensation format.

7. The method according to claim 6, wherein, when the video frame overlaying format is the non-text overlaying format, determining that there is no lost text frame;

when the video frame overlaying format is the motion compensation format, the step of compensating for a lost text frame according to a result of determining the overlaying format comprises: when a first two frames in the three consecutive video frames have corresponding text frames, compensating for the text frame corresponding to the third video frame; when the first frame and the third frame in the three consecutive video frames have corresponding text frames, compensating for the text frame corresponding to the second video frame in the middle.

* * * * *